US012244046B2

(12) United States Patent
Asahi

(10) Patent No.: US 12,244,046 B2
(45) Date of Patent: Mar. 4, 2025

(54) PLANE FILTER

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Yasuaki Asahi, Kawasaki Kanagawa (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 19 days.

(21) Appl. No.: 17/906,589

(22) PCT Filed: Mar. 16, 2021

(86) PCT No.: PCT/JP2021/010521
§ 371 (c)(1),
(2) Date: Sep. 16, 2022

(87) PCT Pub. No.: WO2021/187457
PCT Pub. Date: Sep. 23, 2021

(65) Prior Publication Data

US 2023/0049841 A1 Feb. 16, 2023

(30) Foreign Application Priority Data

Mar. 17, 2020 (JP) ................................ 2020-046515

(51) Int. Cl.
*H01P 1/203* (2006.01)
*H01P 7/08* (2006.01)

(52) U.S. Cl.
CPC ................ *H01P 1/203* (2013.01); *H01P 7/08* (2013.01)

(58) Field of Classification Search
CPC .. H01P 1/203; H01P 1/20327; H01P 1/20336; H01P 1/20354; H01P 1/20363;
(Continued)

(56) References Cited

U.S. PATENT DOCUMENTS 6,483,404 B1 * 11/2002 Ammar .............. H01P 1/20372 333/204
6,667,549 B2 12/2003 Cahill
2010/0301970 A1 12/2010 Wang et al.

FOREIGN PATENT DOCUMENTS

JP H7-212111 A 8/1995
JP H9-232807 A 9/1997
JP 2011-61296 A 3/2011

OTHER PUBLICATIONS

The International Bureau of WIPO, International Preliminary Report on Patentability (Sep. 29, 2022), 6 pages.

* cited by examiner

*Primary Examiner* — Stephen E. Jones
(74) *Attorney, Agent, or Firm* — Finnegan, Henderson, Farabow, Garrett & Dunner, LLP

(57) ABSTRACT

A plane filter includes a dielectric substrate, a filter part provided on the dielectric substrate, and an input/output line connected to the filter part on the dielectric substrate. The filter part and the input/output line are provided on a front surface of the dielectric substrate. The dielectric substrate includes first and second regions. The filter part is provided in the first region, and the input/output line is provided in the second region. The first region having a first thickness in a first direction toward the front surface from a back surface at a side opposite to the front surface. The second region having a second thickness in the first direction, the second thickness being less than the first thickness. The back
(Continued)

surface includes a step corresponding to a difference between the first thickness and the second thickness.

8 Claims, 5 Drawing Sheets

(58) Field of Classification Search
CPC ............. H01P 1/20372; H01P 1/20381; H01P 1/2039; H01P 7/08; H01P 7/082; H01P 7/084; H01P 7/086; H01P 7/088
USPC .................................................. 333/204, 205
See application file for complete search history.

PLANE FILTER

CROSS-REFERENCE TO RELATED APPLICATION

This is a National Phase entry of International Application No. PCT/JP2021/010521, filed Mar. 16, 2021, which claims the benefit of Japanese Application No. 2020-046515, filed Mar. 17, 2020, the contents of each of which are incorporated herein by reference in their entireties.

TECHNICAL FIELD

An embodiment relates to a plane filter.

BACKGROUND ART

The plane filter that is provided on a dielectric substrate is used in a high-frequency band of not less than several GHz and includes, for example, a combination of distributed constant lines. Therefore, downsizing of the plane filter is limited.

PRIOR ART DOCUMENTS

Patent Literature

[Patent Document 1]
JP-A H9-232807 (Kokai)

SUMMARY OF INVENTION

Technical Problem

Embodiments provide a downsized plane filter.

Solution to Problem

A plane filter according to an embodiment includes a dielectric substrate, a filter part provided on the dielectric substrate, and an input/output line connected to the filter part on the dielectric substrate. The filter part and the input/output line are provided on a front surface of the dielectric substrate. The dielectric substrate includes a first region and a second region. The filter part is provided in the first region, and the input/output line is provided on the second region. The first region has a first thickness in a first direction. The second region has a second thickness in the first direction that is less than the first thickness. The first direction is directed toward the front surface from a back surface at a side opposite to the front surface. The backside surface has a step corresponding to a difference between the first thickness and the second thickness.

DESCRIPTION OF EMBODIMENTS

Figure 1A:
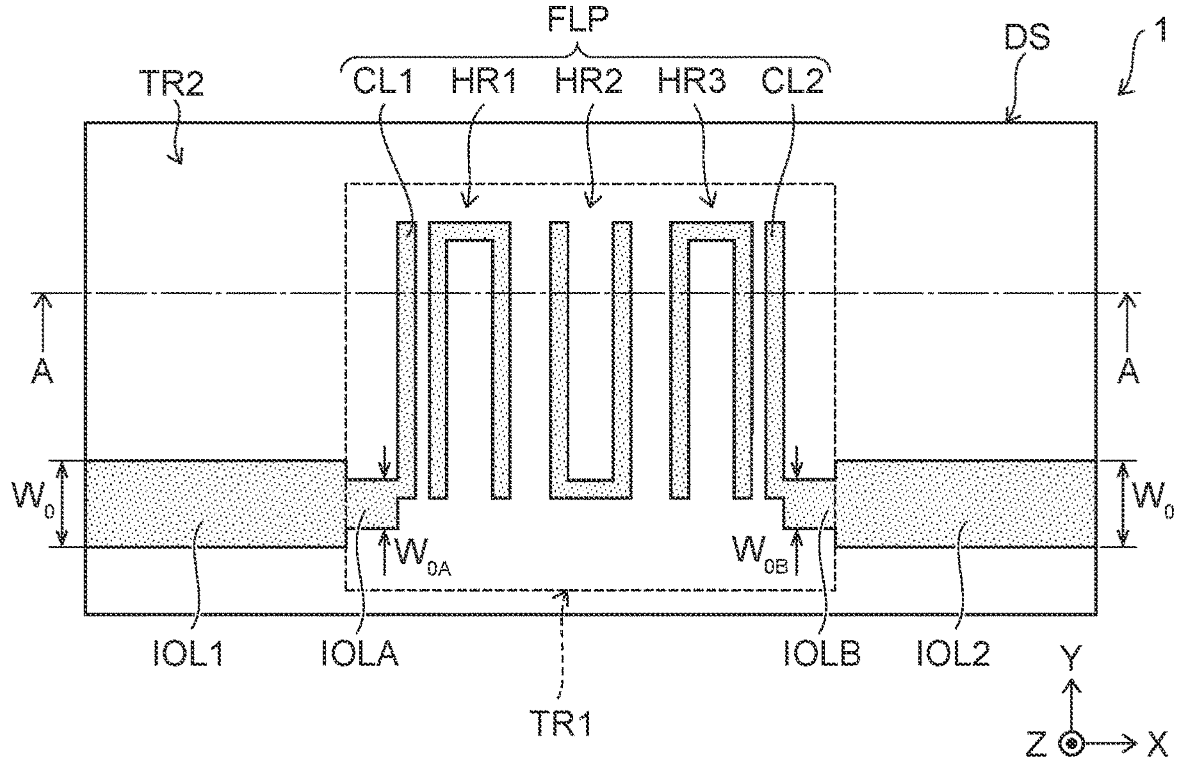
FIG. 1 is a schematic view showing a plane filter according to an embodiment.

Embodiments will now be described with reference to the drawings. The same portions in the drawings are marked with the same numbers; a detailed description is omitted as appropriate; and different portions are described. The drawings are schematic or conceptual; and the relationships between the thickness and width of portions, the proportions of sizes among portions, etc., are not necessarily the same as the actual values. Also, the dimensions and proportions may be illustrated differently among drawings, even when the same portion is illustrated.

Furthermore, the arrangements and configurations of the portions are described using an X-axis, a Y-axis, and a Z-axis shown in the drawings. The X-axis, the Y-axis, and the Z-axis are orthogonal to each other and respectively represent an X-direction, a Y-direction, and a Z-direction. Also, there are cases where the Z-direction is described as up, and the opposite direction is described as down.

Figure 1B:
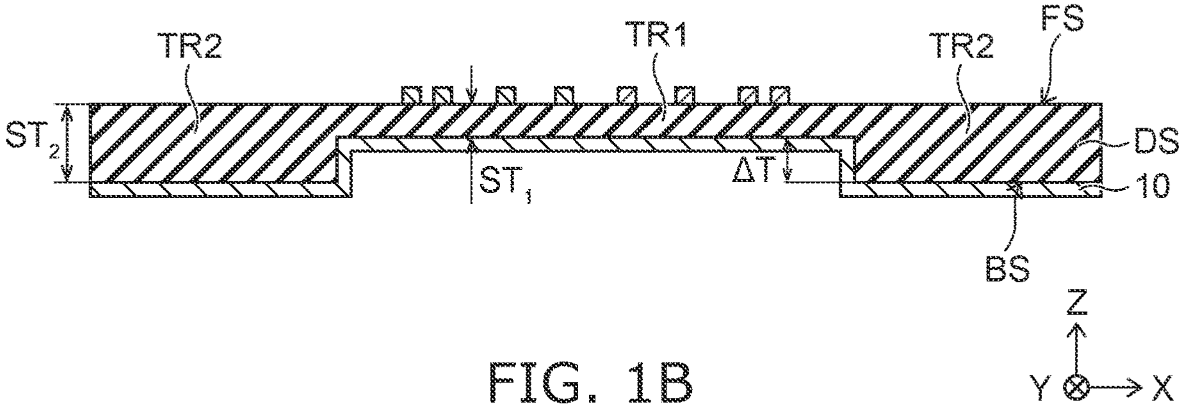

FIGS. 1A and 1B are schematic views showing a plane filter 1 according to an embodiment.

FIG. 1A is a plan view showing the front surface of a dielectric substrate DS. FIG. 1B is a cross-sectional view along line A-A shown in FIG. 1A.

As shown in FIG. 1A, the plane filter 1 includes the dielectric substrate DS, a filter part FLP, an input/output line IOL1, and an input/output line IOL2. The plane filter 1 includes multiple distributed constant lines provided on the front surface of the dielectric substrate DS.

The dielectric substrate DS includes a first region TR1 and a second region TR2. The filter part FLP is provided on the first region TR1. The input/output lines IOL1 and IOL2 are provided on the second region TR2. The dielectric substrate DS is, for example, a PPE resin substrate.

The filter part FLP is located between the input/output line IOL1 and the input/output line IOL2. The input/output line IOL1, the filter part FLP, and the input/output line IOL2 are arranged in a direction (e.g., the X-direction) along the front surface of the dielectric substrate DS. The input/output line IOL1 and the input/output line IOL2 each extend in the X-direction and are connected to the filter part FLP. The input/output line IOL1 and the input/output line IOL2 each have a line width $W_0$ in a direction (e.g., the Y-direction) along the front surface of the dielectric substrate DS.

Assuming, for example, a hairpin filter, a microwave signal is input to the input/output line IOL1 and output from the input/output line IOL2 via the filter part FLP. Also, the microwave signal may be input to the input/output line IOL2 and output from the input/output line IOL1 via the filter part FLP.

The filter part FLP includes, for example, a resonator HR1, a resonator HR2, a resonator HR3, a first coupling line CL1, a second coupling line CL2, a connecting line IOLA, and a connecting line IOLB. The resonators HR1 to HR3 are apart from each other and arranged in, for example, the X-direction. The resonator HR2 is provided between the resonator HR1 and the resonator HR3.

The first coupling line CL1 is provided between the connecting line IOLA and the resonator HR1. The first coupling line CL1 is connected to the connecting line IOLA. Also, the first coupling line CL1 is apart from the resonator HR1.

The second coupling line CL2 is provided between the connecting line IOLB and the resonator HR3. The second coupling line CL2 is connected to the connecting line IOLB. Also, the second coupling line CL2 is apart from the resonator HR3.

The input/output line IOLA is provided between the first coupling line CL1 and the input/output line IOL1. The input/output line IOLA is connected to the input/output line IOL1 at the boundary between the first region TR1 and the second region TR2. Also, the input/output line IOLA is connected to the first coupling line CL1 on the first region TR1. For example, the input/output line IOLA has a width $W_{0A}$ in the Y-direction. The width $W_{0A}$ is less than a width $W_0$ in the Y-direction of the input/output line IOL1.

By providing the input/output line IOLA, the impedance discontinuity of the line is reduced, and the reflection of the microwave can be reduced between the input/output line IOL1 and the first coupling line CL1.

The input/output line IOLB is provided between the second coupling line CL2 and the input/output line IOL2. The input/output line IOLB is connected to the input/output line IOL2 at the boundary between the first region TR1 and the second region TR2. Also, the input/output line IOLB is connected to the second coupling line CL2 on the first region TR1. For example, the input/output line IOLB has a width $W_{0B}$ in the Y-direction. The width $W_{0B}$ is less than the width $W_0$ in the Y-direction of the input/output line IOL2.

By providing the input/output line IOLB, the impedance discontinuity of the line is reduced, and the reflection of the microwave can be reduced between the input/output line IOL2 and the second coupling line CL2.

The input/output line IOL1, the input/output line IOL2, the resonators HR1 to HR3, the first coupling line CL1, and the second coupling line CL2 each are metal layers provided on the dielectric substrate DS and include, for example, copper (Cu).

As shown in FIG. 1B, the dielectric substrate DS has a first thickness $ST_1$ and a second thickness $ST_2$ in the direction (e.g., the Z-direction) from a back surface BS toward a front surface FS of the dielectric substrate DS. The first thickness $ST_1$ is less than the second thickness $ST_2$. The dielectric substrate DS has the first thickness $ST_1$ in the first region TR1, and has the second thickness $ST_2$ in the second region TR2. Moreover, the dielectric substrate DS includes, for example, a step at the back surface BS side thereof. The step is provided at the boundary between the first region TR1 and the second region TR2, and corresponds to a difference $\Delta T$ between the first thickness $ST_1$ and the second thickness $ST_2$.

The dielectric substrate DS includes a metal layer 10 covering the back surface BS of the dielectric substrate DS. The metal layer 10 includes, for example, copper (Cu). The metal layer 10 also covers the step at the back surface BS side of dielectric substrate DS.

Figure 2:
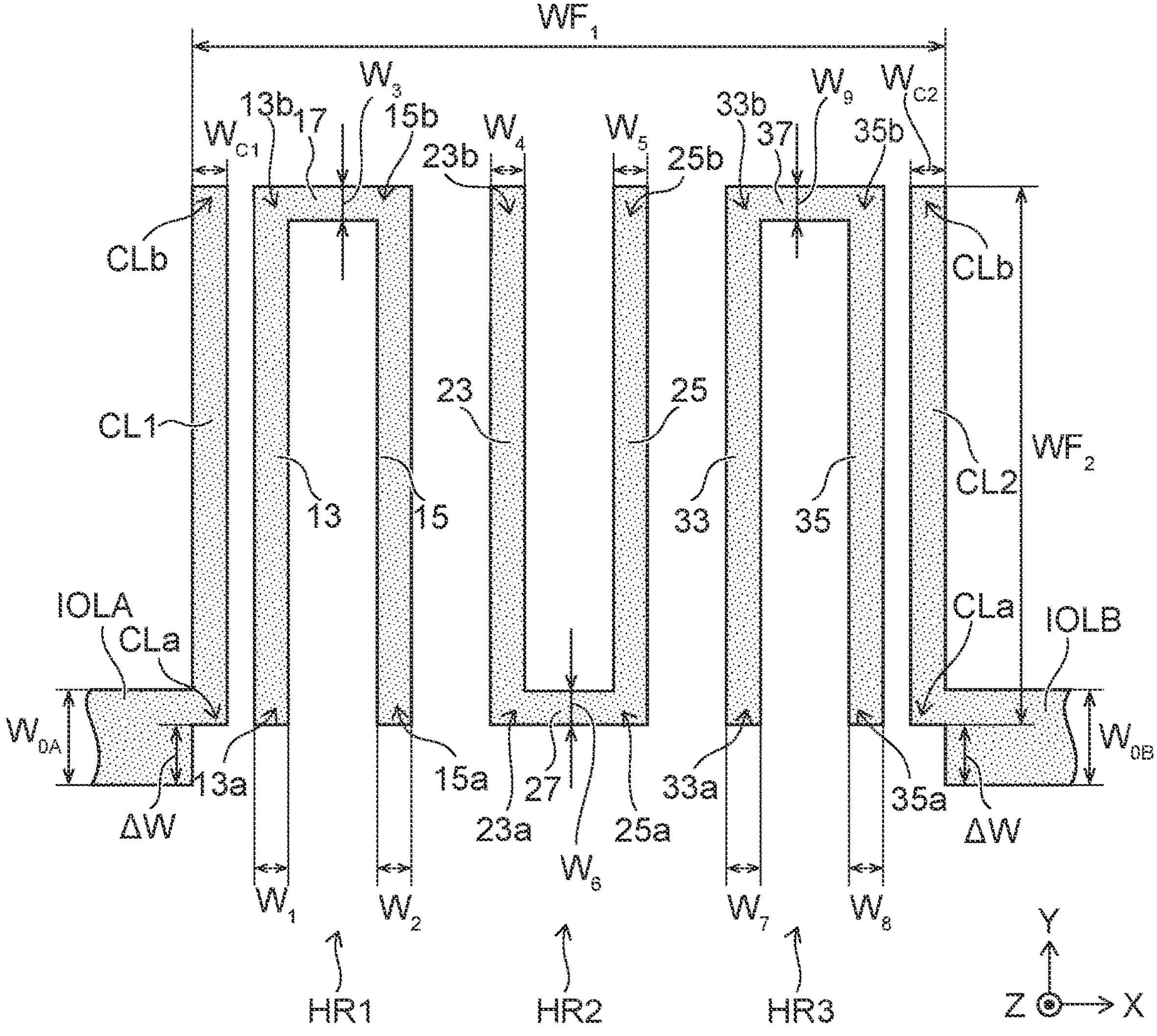
FIG. 2 is a partial plan view schematically showing the plane filter according to the embodiment.

FIG. 2 is a partial plan view schematically showing the plane filter 1 according to the embodiment. FIG. 2 is a schematic view showing the filter part FLP.

As shown in FIG. 2, the first resonator HR1 includes a first line 13, a second line 15, and a third line 17. The first line 13 and the second line 15 each extend in a direction (e.g., the Y-direction) along the front surface FS of the dielectric substrate DS. The first line 13 and the second line 15 are apart from each other and faces each other.

The first line 13 includes a first end 13*a* and a second end 13*b* arranged in this order in the Y-direction. The second line 15 includes a first end 15*a* and a second end 15*b* arranged in this order in the Y-direction. For example, the third line 17 extends in the X-direction and is connected to the second end 13*b* of the first line 13 and the second end 15*b* of the second line 15.

The second resonator HR2 includes a fourth line 23, a fifth line 25, and a sixth line 27. The fourth line 23 and the fifth line 25 each extend in the Y-direction. The fourth line 23 and the fifth line 25 are apart from each other and faces each other.

The fourth line 23 includes a first end 23*a* and a second end 23*b* arranged in this order in the Y-direction. The fifth line 25 includes a first end 25*a* and a second end 25*b* arranged in this order in the Y-direction. For example, the sixth line 27 extends in the X-direction and is connected to the first end 23*a* of the fourth line 23 and the first end 25*a* of the fifth line 25.

A third resonator HR3 includes a seventh line 33, an eighth line 35, and a ninth line 37. The seventh line 33 and the eighth line 35 each extend in the Y-direction. The seventh line 33 and the eighth line 35 are apart from each other and faces each other.

The seventh line 33 includes a first end 33*a* and a second end 33*b* arranged in this order in the Y-direction. The eighth line 35 includes a first end 35*a* and a second end 35*b* arranged in this order in the Y-direction. For example, the ninth line 37 extends in the X-direction and is connected to the second end 33*b* of the seventh line 33 and the second end 35*b* of the eighth line 35.

The first resonator HR1 and the second resonator HR2 are apart from each other and arranged in the X-direction; and the second line 15 of the first resonator HR1 faces the fourth line 23 of the second resonator HR2. Also, the first end 15*a* of the second line 15 faces the first end 23*a* of the fourth line 23; and the second end 35*b* of the second line 15 faces the second end 23*b* of the fourth line 23.

The second resonator HR2 and the third resonator HR3 are apart from each other and arranged in the X-direction; and the fifth line 25 of the second resonator HR2 faces the seventh line 33 of the third resonator HR3. Also, the first end 25*a* of the fifth line 25 faces the first end 33*a* of the seventh line 33; and the second end 25*b* of the fifth line 25 faces the second end 33*b* of the seventh line 33.

The first coupling line CL1 extends in the Y-direction and faces the first line 13 of the first resonator HR1 in the X-direction. The first coupling line CL1 includes a first end CLa and a second end CLb arranged in this order in the Y-direction and is connected to the connecting line IOLA at the first end CLa. Also, the first end CLa of the first coupling line CL1 faces the first end 13*a* of the first line 13; and the second end CLb of the first coupling line CL1 faces the second end 13*b* of the first line 13.

The second coupling line CL2 extends in the Y-direction and faces the eighth line 35 of the third resonator HR3 in the X-direction. The second coupling line CL2 includes the first end CLa and the second end CLb arranged in this order in the Y-direction and is connected to the connecting line IOLB at the first end CLa. Also, the first end CLa of the second coupling line CL2 faces the first end 35*a* of the eighth line 35; and the second end CLb of the second coupling line CL2 faces the second end 35*b* of the eighth line 35.

The first coupling line CL1 is connected to the X-direction end of the connecting line IOLA. The first coupling line CL1 is connected at a position such that the first end CLa is shifted $\Delta W$ in the Y-direction from one of the two corners at the end of the connecting line IOLA. For example, the first coupling line CL1 is connected to the connecting line IOLA with a connection width of $W_{0A}-\Delta W$, where $W_{0A}$ is the Y-direction width of the connecting line IOLA.

The second coupling line CL2 is similarly connected to the X-direction end of the connecting line IOLB. In other words, the second coupling line CL2 is connected at a position such that the first end CLa is shifted ΔW in the Y-direction from one of the two corners at the end of the connecting line IOLB. For example, the second coupling line CL2 is connected to the connecting line IOLB with a connection width of $W_{0B}-\Delta W$, where $W_{0B}$ is the Y-direction width of the connecting line IOLB.

A width $W_1$ in the X-direction of the first line 13, a width $W_2$ in the X-direction of the second line 15, a width $W_4$ in the X-direction of the fourth line 23, a width $W_5$ in the X-direction of the fifth line 25, a width $W_7$ in the X-direction of the seventh line 33, and a width $W_8$ in the X-direction of the eighth line 35 are, for example, less than the width $W_{0A}$ in the Y-direction of the connecting line IOLA and the width $W_{0B}$ in the Y-direction of the connecting line IOLB. For example, the widths $W_1$, $W_2$, $W_4$, $W_5$, $W_7$, and $W_8$ are substantially the same.

A width $W_3$ in the Y-direction of the third line 17, a width $W_6$ in the Y-direction of the sixth line 27, and a width $W_9$ in the Y-direction of the ninth line 37 are, for example, less than the width $W_0$. For example, the widths $W_3$, $W_6$, and $W_9$ are substantially the same.

According to the embodiment, the first to ninth lines 13-37, the first coupling line CL1, and the second coupling line CL2 each have, for example, a characteristic impedance of 85Ω. Also, the first connecting line IOLA, the second connecting line IOLB, the input/output line IOL1, and the input/output line IOL2 each have, for example, a characteristic impedance of 50Ω. Therefore, in the filter part FLP provided on the first region TR1, the widths $W_1$ to $W_9$ of the first to ninth lines 13-37, a width $W_{C1}$ in the X-direction of the first coupling line CL1, and a width $W_{C2}$ in the X-direction of the second coupling line CL2 are, for example, narrower than such widths when the filter part FLP is provided on a dielectric substrate that does not include the first region TR1. Furthermore, the distances between the lines next to each other in the X-direction can be reduced. Thereby, a width $WF_1$ in the X-direction of the filter part FLP is narrower compared to, for example, when provided on a dielectric substrate that does not include the first region TR1. As a result, the plane filter 1 is downsized compared to that provided on a dielectric substrate that does not include the first region TR1. A width $WF_2$ in the Y-direction of the filter part FLP is, for example, substantially the same as λ/4 (λ: microwave wavelength).

For example, the plane filter can be downsized by making the dielectric substrate thin. However, when the dielectric substrate is made thin, the substrate easily warps, and the mechanical strength of the substrate is reduced. According to the embodiment, by providing the first region TR1 and the second region TR2, the plane filter 1 can be downsized while maintaining the mechanical strength of the dielectric substrate DS.

Figure 3:
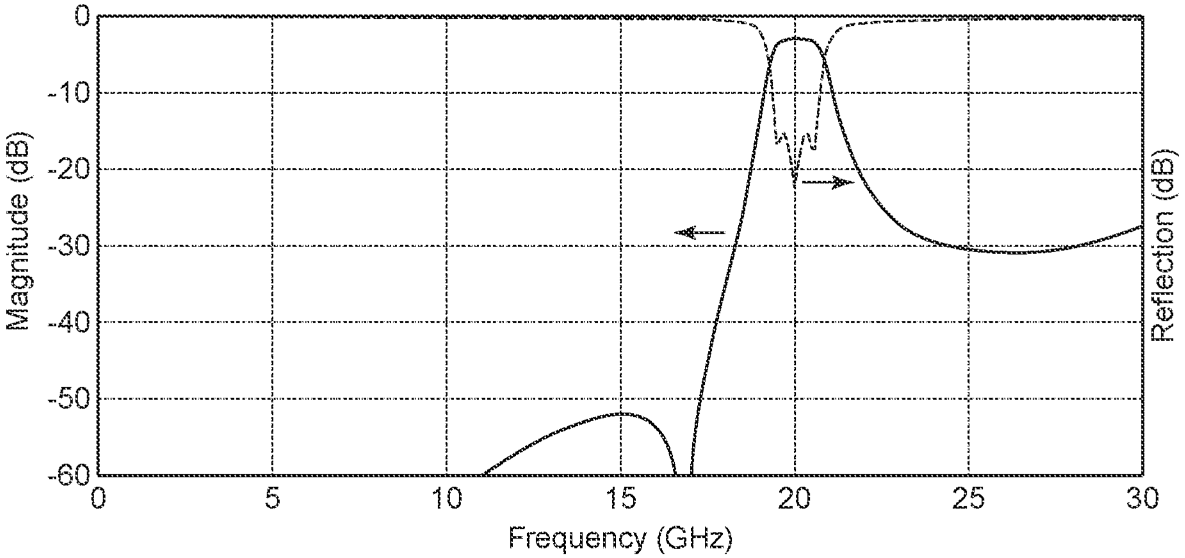
FIG. 3 is a graph showing characteristics of the plane filter according to the embodiment.

FIG. 3 is a graph showing characteristics of the plane filter 1 according to the embodiment. The horizontal axis is the microwave frequency (GHz), and the vertical axis is a transmission coefficient (dB) and a reflection coefficient (dB) of the microwave.

As shown in FIG. 3, the plane filter 1 is a band-pass filter having a center frequency of 20 GHz. The pass characteristic is about negative 2.8 dB, and the passband width is about 1.5 GHz.

In the example, the dielectric substrate DS is a PPE resin substrate. The first thickness $ST_1$ of the first region TR1 is 0.2 mm, and the second thickness $ST_2$ of the second region TR2 is 0.4 mm. The width $WF_1$ in the X-direction of the filter part FLP is 2.95 mm, and the width $WF_2$ in the Y-direction is 2.25 mm.

Figure 6:
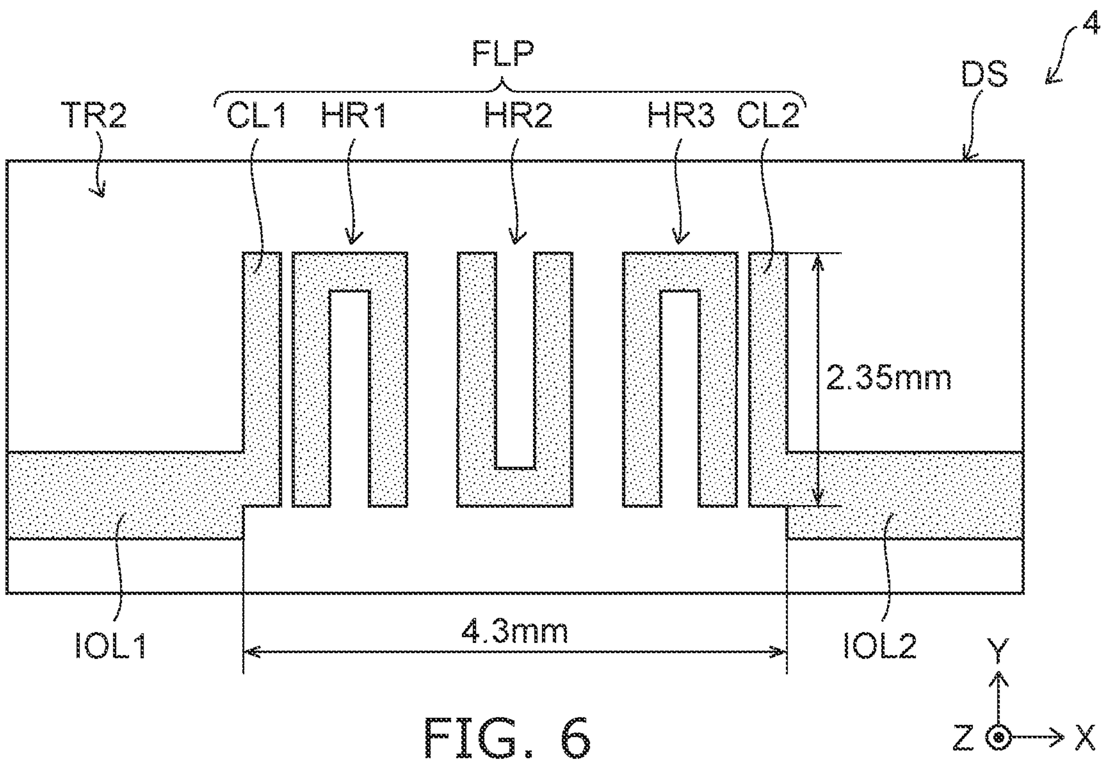
FIG. 6 is a schematic view showing a plane filter according to a comparative example.
Figure 7:
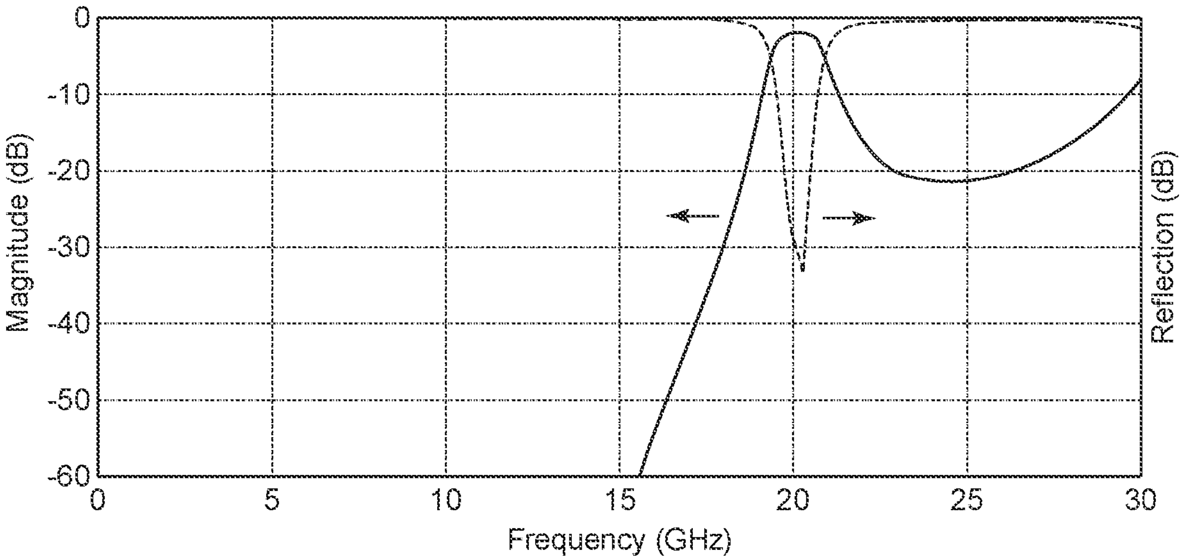
FIG. 7 is a graph showing characteristics of the plane filter according to the comparative example.

For example, a plane filter 4 shown in FIG. 6 is provided on a dielectric substrate having a Z-direction thickness of 0.4 mm. The plane filter 4 is provided on a dielectric substrate having a uniform thickness and does not include the first region TR1. As shown in FIG. 7, the plane filter 4 has a pass characteristic equivalent to that of the plane filter 1; and the X-direction width of the filter part FLP of the plane filter 4 is 4.3 mm. In other words, in the plane filter 1 according to the embodiment, it is possible to reduce the surface area of the dielectric substrate about 35% without changing the pass characteristic.

Figure 4:
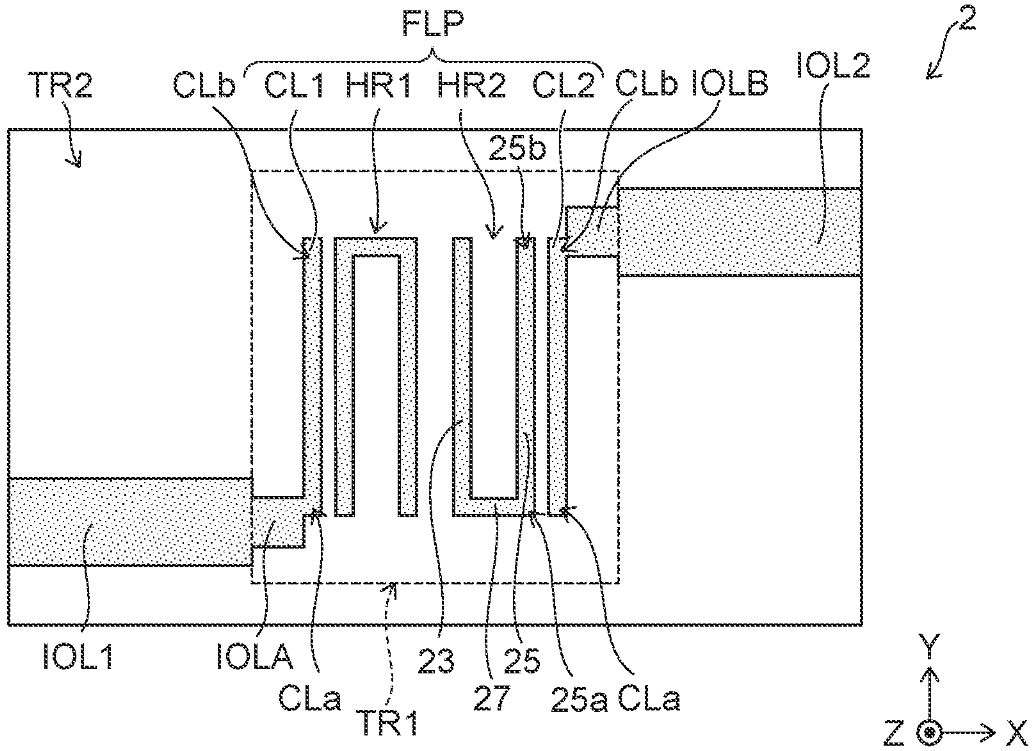
FIG. 4 is a schematic view showing a plane filter according to a first modification of the embodiment.

FIG. 4 is a schematic view showing a plane filter 2 according to a first modification of the embodiment. The plane filter 2 includes the filter part FLP, the input/output line IOL1, and the input/output line IOL2 provided on the front surface of the dielectric substrate DS. The filter part FLP is provided on the first region TR1. The input/output lines IOL1 and IOL2 are provided on the second region TR2.

In the example, the filter part FLP includes the resonator HR1, the resonator HR2, the first coupling line CL1, the second coupling line CL2, the connecting line IOLA, and the connecting line IOLB. The arrangement of the input/output line IOL1, the connecting line IOLA, the first coupling line CL1, and the resonator HR1 is the same as that of the plane filter 1.

The second coupling line CL2 is provided between the resonator HR2 and the connecting line IOLB and faces the fifth line 25 of the resonator HR2. The first end 25*a* of the fifth line 25 faces the first end CLa of the second coupling line CL2. The second end 25*b* of the fifth line 25 faces the second end CLb of the second coupling line CL2. The connecting line IOLB is connected to the second end CLb of the second coupling line CL2.

The connecting line IOLB is connected to the input/output line IOL2 at the boundary between the first region TR1 and the second region TR2. The input/output line IOL2 extends in the X-direction along the front surface of the dielectric substrate DS.

Thus, the resonators HR1 to HR2 are appropriately arranged between the first coupling line CL1 and the second coupling line CL2 to obtain the desired filter characteristics. The number of resonators is not limited to these examples; for example, three or more resonators may be provided between the first coupling line CL1 and the second coupling line CL2.

Figure 5A:
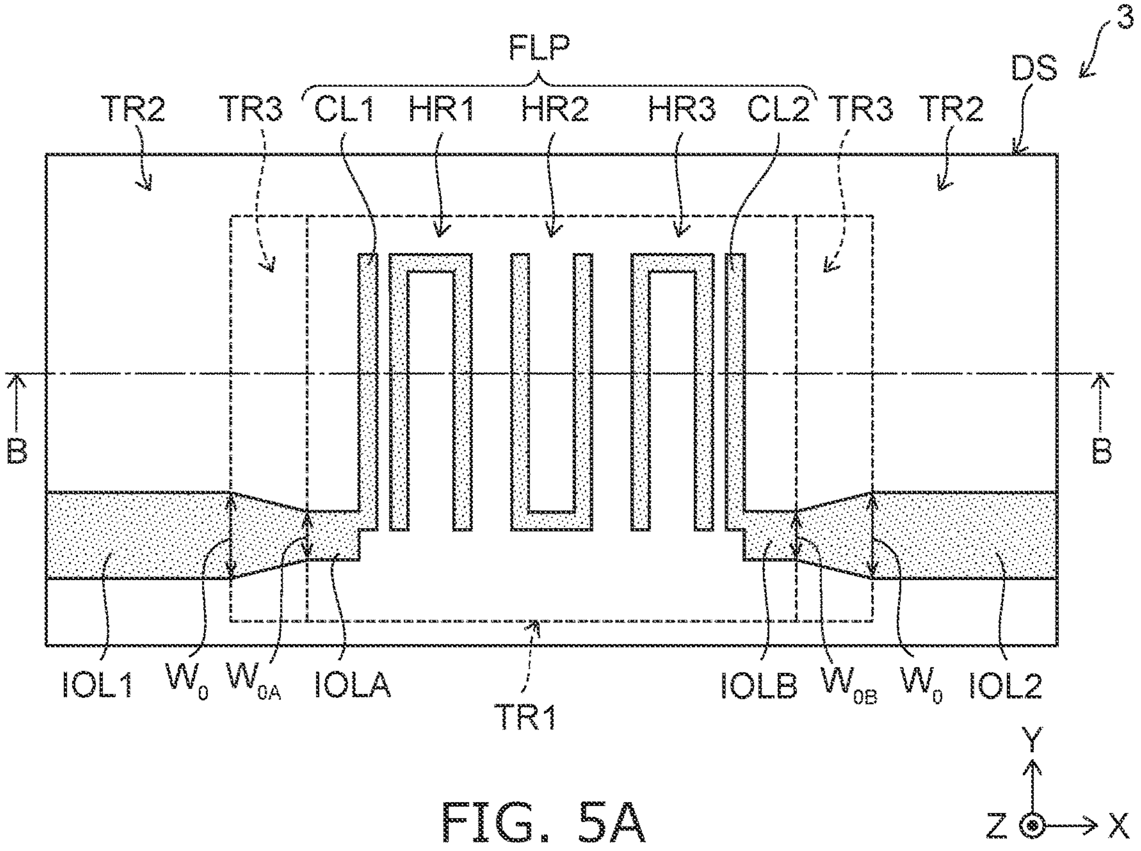
FIG. 5 is a schematic view showing a plane filter according to a second modification of the embodiment.
Figure 5B:
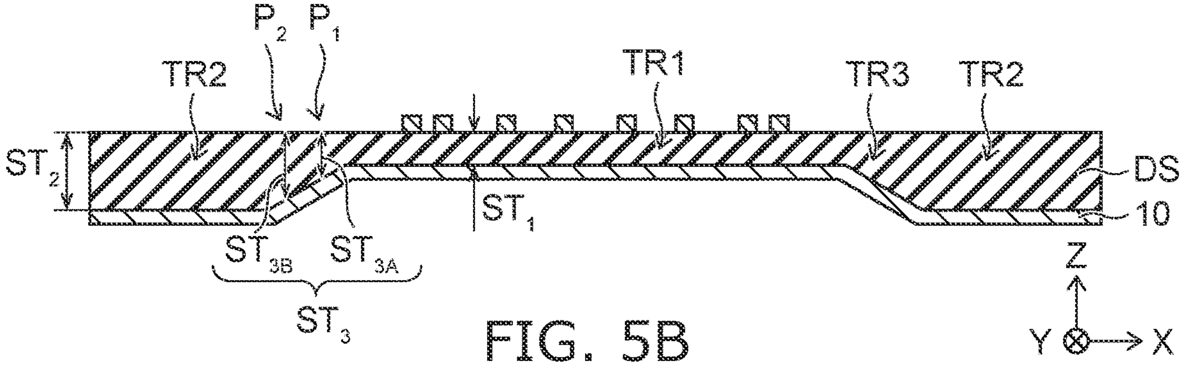

FIGS. 5A and 5B are schematic views showing a plane filter 3 according to a third modification of the embodiment. FIG. 5A is a plan view showing the front surface of the dielectric substrate DS. FIG. 5B is a cross-sectional view along line B-B shown in FIG. 5A.

The plane filter 3 includes the filter part FLP, the input/output line IOL1, and the input/output line IOL2 provided on the front surface of the dielectric substrate DS. The filter part FLP is provided on the first region TR1. The input/output lines IOL1 and IOL2 are provided on the second region TR2.

As shown in FIG. 5A, the dielectric substrate DS further includes a third region TR3. The third region TR3 is provided between the first region TR1 and the second region TR2. The plane filter 3 further includes the connecting line IOLA and the connecting line IOLB extending over the first region TR1 and the third region TR3.

The connecting line IOLA is provided between the first coupling line CL1 and the input/output line IOL1. The connecting line IOLA is connected to the input/output line IOL1 at the boundary between the second region TR2 and the third region TR3. Also, the connecting line IOLA is connected to the first coupling line CL1 in the first region TR1.

For example, the connecting line IOLA has the width $W_0$ in the Y-direction at the boundary between the second region TR2 and the third region TR3. Also, the connecting line IOLA has the width $W_{0A}$ in the Y-direction on a first region TR. The connecting line IOLA has the width $W_{0A}$ in the Y-direction at the boundary between the first region TR1 and the third region TR3. The width $W_{0A}$ is less than the width $W_0$. The Y-direction width of the connecting line IOLA becomes narrower from the boundary of the second region TR2 and the third region TR3 toward the boundary of the first region TR1 and the third region TR3.

The connecting line IOLB is provided between the second coupling line CL2 and the input/output line IOL2. The connecting line IOLB is connected to the input/output line IOL2 at the boundary of the second region TR2 and the third region TR3. Also, the connecting line IOLB is connected to the second coupling line CL2 in the first region TR1.

For example, the connecting line IOLB has the width $W_0$ in the Y-direction at the boundary of the second region TR2 and the third region TR3. Also, the connecting line IOLB has the width $W_{0B}$ in the Y-direction on the first region TR1. Also, the connecting line IOLB has the width $W_{0B}$ in the Y-direction at the boundary of the first region TR1 and the third region TR3. The width $W_{0B}$ is less than the width $W_0$. The Y-direction width of the connecting line IOLB becomes narrower from the boundary of the second region TR2 and the third region TR3 toward the boundary of the first region TR1 and the third region TR3.

As shown in FIG. 5B, for example, the dielectric substrate DS has the second thickness $ST_2$ at the boundary of the second region TR2 and the third region TR3. Also, the dielectric substrate DS has the first thickness $ST_1$ at the boundary of the first region TR1 and the third region TR3. In other words, a third thickness $ST_3$ of the third region TR3 becomes thin toward the first region TR1.

For example, the dielectric substrate DS has a third thickness $ST_{3A}$ at a first position $P_1$ in the third region TR3, and has a third thickness $ST_{3B}$ at a second position $P_2$. The first position $P_1$ is positioned between the first region TR1 and the second position $P_2$; and the third thickness $ST_{3A}$ is less than the third thickness $ST_{3B}$.

By the configuration described above, for example, the connecting line IOLA and the connecting line IOLB are provided to each have a characteristic impedance of 50Ω.

In the example, the reflection of the microwave can be further reduced between the input/output line IOL1 and the first coupling line CL1 and between the input/output line IOL2 and the second coupling line CL2.

While certain embodiments of the inventions have been described, these embodiments have been presented by way of example only, and are not intended to limit the scope of the inventions. These novel embodiments may be embodied in a variety of other forms; and various omissions, substitutions, and changes may be made without departing from the spirit of the inventions. Such embodiments and their modifications are within the scope and spirit of the inventions, and are within the scope of the inventions described in the claims and their equivalents.

The invention claimed is:

1. A plane filter, comprising:

a dielectric substrate;

a filter part provided on the dielectric substrate; and an input/output line connected to the filter part on the dielectric substrate, the dielectric substrate including a front surface and a back surface, the back surface being at a side opposite to the front surface, the filter part and the input/output line being provided on the front surface, the dielectric substrate further including a first region and a second region, the filter part being provided in the first region, the input/output line being provided in the second region, the second region extending along an outer edge of the dielectric substrate and surrounding the first region, the first region having a first thickness in a first direction, the first direction being directed from the back surface toward the front surface, the second region having a second thickness in the first direction, the second thickness being greater than the first thickness, the back surface having a step corresponding to a difference between the first thickness and the second thickness, a connecting line provided on the first region and linking the input/output line and the filter part, the input/output line and the filter part being arranged in a second direction along the front surface of the dielectric substrate, the input/output line having a width in a third direction along the front surface of the dielectric substrate, the third direction crossing the second direction, the connecting line having a width in the third direction, the width of the connecting line in the third direction being less than the width of the input/output line in the third direction.

2. The plane filter according to claim 1, wherein the input/output line extends in the second direction; and the filter part includes a first resonator including first to third lines, the first line extending in the third direction along the front surface of the dielectric substrate, the first line including a first end and a second end arranged in this order in the third direction, the second line extending in the third direction, the second line being apart from the first line and facing the first line, the second line including a first end and a second end arranged in this order in the third direction;

the third line extending in the second direction, the third line being connected to the second end of the first line and the second end of the second line.

3. The plane filter according to claim 2, wherein the filter part further includes a second resonator including fourth to sixth lines, the fourth line extending in the third direction, the fourth line including a first end and a second end arranged in this order in the third direction, the fifth line extending in the third direction, the fifth line being apart from the fourth line and faces the fourth line, the fifth line including a first end and a second end arranged in this order in the third direction, the sixth line extending in the second direction, the sixth line being connected to the first end of the fourth line and the first end of the fifth line; and the first resonator and the second resonator are arranged in the second direction and apart from each other, the second line of the first resonator facing the fourth line of the second resonator, the first end of the second line facing the first end of the fourth line, the second end of the second line facing the second end of the fourth line.

4. The plane filter according to claim 3, wherein the fourth line and the fifth line have a fourth width and a fifth width respectively in the second direction, and the fourth width and the fifth width are less than the width in the third direction of the input/output line.

5. The plane filter according to claim 4, wherein the sixth line has a sixth width in the third direction, and the sixth width is less than the width in the third direction of the input/output line.

6. The plane filter according to claim 3, wherein the first resonator is provided between the input/output line and the second resonator, the filter part further includes a coupling line extending in the third direction, the coupling line including a first end and a second end arranged in this order in the third direction, and the coupling line is positioned between the input/output line and the first resonator, the coupling line being apart from the first line of the first resonator and facing the first line of the first resonator, the first end of the coupling line being connected to the input/output line and facing the first end of the first line, the second end of the coupling line facing the second end of the first line.

7. The plane filter according to claim 2, wherein the first line and the second line have a first width and a second width respectively in the second direction, and the first width and the second width are less than the width of the input/output line in the third direction.

8. The plane filter according to claim 7, wherein the third line has a third width in the third direction, and the third width is less than the width in the third direction of the input/output line.

* * * * *